Oct. 26, 1965 R. L. DEGA 3,214,179
SEAL AND METHOD OF SEALING BETWEEN RELATIVELY ROTATING MEMBERS
Filed Dec. 4, 1962

INVENTOR.
Robert L. Dega
BY
E. W. Christen
ATTORNEY

United States Patent Office 3,214,179
Patented Oct. 26, 1965

3,214,179
SEAL AND METHOD OF SEALING BETWEEN RELATIVELY ROTATING MEMBERS
Robert L. Dega, Utica, Mich., assignor to General Motors Corporation, Detroit, Mich., a corporation of Delaware
Filed Dec. 4, 1962, Ser. No. 242,239
2 Claims. (Cl. 277—1)

This is a continuation-in-part of my copending application S.N. 46,412, filed August 1, 1960, and now abandoned.

This invention relates to fluid seals and more particularly to flexible lip-type seals which are adapted to be used between cylindrical surfaces or the like.

Fluid seals having flexible lip portions adapted for sealing engagement with a rotating shaft have been known for many years and the art of attempting to effect a non-leaking relationship between a seal and a rotating shaft is highly developed. Such sealing devices have been provided with spring elements, multiple sealing faces, serrations and grooves, and the like in countless varieties and modifications in attempts to improve sealing qualities. In conventional practice, the seals have been preferably fabricated from any natural or synthetic rubber or plastic which is elastic, pliable and deformable, and which is deterioration resistant to the material or materials to be sealed, usually oil or grease, and hereinafter referred to occasionally as the sealant. In general, any moldable material which has sufficient resiliency to provide an adequate seal has been found to be satisfactory. Sealing qualities depend, in part, on the radial pressures exerted by the sealing lip and/or the spring elements associated therewith to maintain a fluid sealing engagement between the flexible lip and the associated shaft element. In present seal designs, such factors as rubber hardness, trim interference, spring quality, and seal eccentricity are relatively uncontrolled and all have adverse effects upon the running characteristics of lip-type seals. Shaft variables are another factor in seal design that have received little attention in the past. To varying degrees shaft parameters such as; surface finish, r.p.m., waviness or machining lead, and concentricity with the seal lip have an effect on the dynamic sealing quality. Unit lip pressures of lip-type seals of present design vary tremendously depending upon variations in the aforementioned factors.

Figure 1:
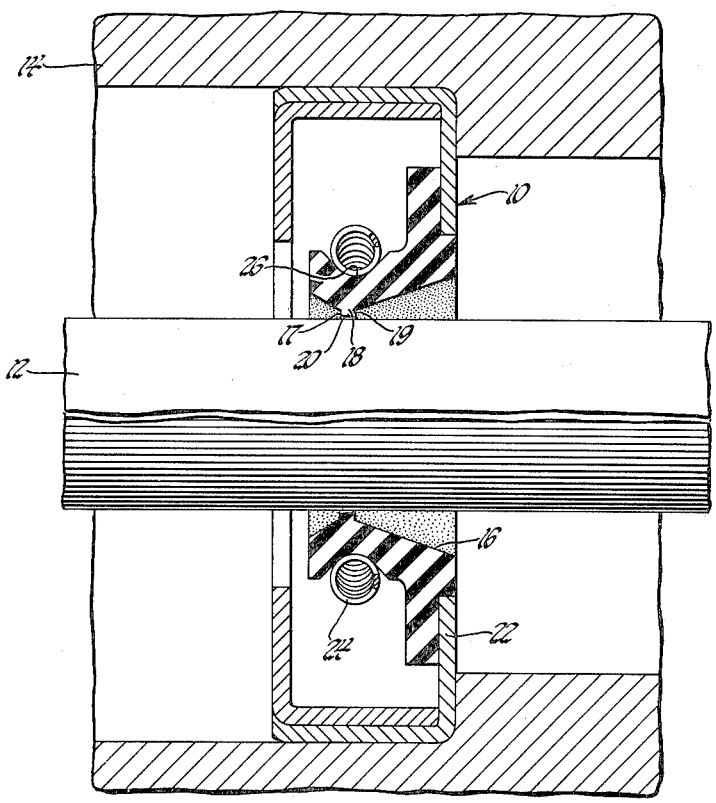
Figure 2:
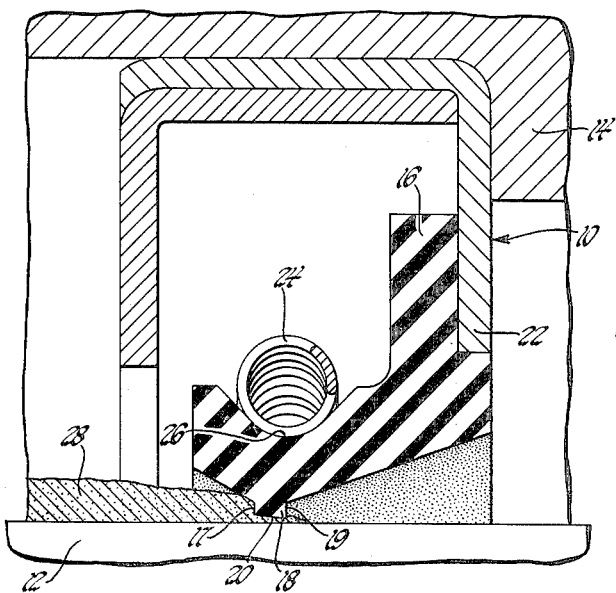

The primary purpose of this invention is to provide a fluid seal having precisely controlled seal characteristics to effect maximum sealing quality. Another object is to provide a fluid seal adapted to operate with a shaft in a manner similar to a journal bearing that employs an oil film sufficiently thick to prevent actual contact between the relatively rotating units. Further objects and advantages are disclosed in the detailed description and the accompanying drawing wherein:

FIGURE 1 is a side sectional view of a fluid seal embodying the present invention in assembled position; and FIGURE 2 is an enlarged sectional view of the fluid seal shown in FIGURE 1 under running conditions.

Referring to FIGURE 1, a fluid seal unit 10 is shown in assembled position between a rotatable shaft 12 and a housing 14. The fluid seal unit 10 comprises a flexible sealing element 16 having a lip portion 18 extending radially inwardly in wiping contact with the shaft 12. A bottom surface 20 on the lip 18 lightly engages the shaft and is inclined downwardly with respect to the direction of sealant flow; that is, the inclination is downwardly from the leading edge 17 on the oil side, to the trailing edge 19 on the dust side. The sealing element 16 is bonded or otherwise suitably secured to an outer casing 22, and a greater spring element 24 is seated in a groove 26 on the outer periphery of the flexible sealing element 16. The relationship of the garter spring groove 26 to the bottom surface 20 is important. The center of the groove is aligned with the rear face of the lip 18 so that when the garter spring is installed, radially directed spring pressures are concentratated at the back edge of the surface 20. The reason for this will be explained. Although a metallic casing is shown for purposes of illustration, that portion of the fluid seal unit may be of any conventional design including a molded casing formed integrally with the flexible sealing element.

By way of explanation, it is well known that a lubricating oil-film is used in certain well known types of thrust or step bearings. In such a device, the thrust or weight is sustained by flat rings or discs between which an oil film is maintained by introducing oil under high pressure at the interior. In flowing to the exterior and there escaping, the oil actually forces the surfaces apart and thus carries the thrust or weight. The separation of the surfaces undoubtedly occurs and has been measured in the thousandths of an inch. A similar principle is found in the ordinary horizontal journal bearing. As usually constructed, there is a small clearance between the shaft and the journal box. This clearance is ordinarily sufficient to permit the formation of an oil film between the relatively rotating surfaces. It is common practice to supply oil on top of the journal either from a reservoir or self-oiling device. This oil is then carried around by the shaft and forms an oil film that actually prevents metal to metal contact between the rotating parts. An excessive amount of clearance makes it difficult to form or maintain the oil film. It often happens also that under particular conditions, the pressure exerted between the shaft and journal box becomes sufficient to force out the oil and break the film even though the clearance space is ample for its formation. This excessive pressure may be only temporary or it may be due to a peculiar combination of weight of the parts, side stresses, and so on. If the oil film is broken at any point it may not be formed until after the point of supply of the oil is reached again in the rotation of the shaft.

Let us consider the above principles in connection with lip seals. It has been the prevailing belief that the tighter the seal on the shaft, the less likely it is to leak. Obviously, an oil film in the nature of that found in the journal bearing would be prevented from forming in the usual lip seal installation because of the high lip loads that occur in standard trimmed seal lip designs. The sharp edge of the lip is inimical to the formation of any oil film. The seal must "wear in" to a running condition which gives lip loads desirable for sealing, but having harmful effects on the life of the seal. Trimmed lip seals start out with a unit lip load between 200 and 300 p.s.i. however, the seal lips cannot run at unit loads much in excess of 60 p.s.i. so that a rapid change occurs due to wear. Associated with this wear is high heat which invariably decomposes the surface of the seal lip causing cracking and general fatigue failures of the elastomers. This "wear in" process is the cause of many early seal failures.

This practice of breaking in a seal on the shaft is quite universal and is diametrically opposed to the concept of establishing an oil film in the manner above described. To my knowldege, the application of the oil film principle to lip seals is revolutionary and was first enunciated in my copending application Serial No. 46,412, filed August 1, 1960, and now abandoned.

As a continuation of this earlier development, I have evolved the present seal design based essentially on the sound engineering principles of my above-identified application.

As an illustration, let us consider another type of journal bearing. In the case of high speed bearings, it may not be desirable to have as much clearance between the relatively rotating members to establish an oil film as previously described. It is common, therefore, to form wedge-like surfaces in one of the rotatable members which trap lubricants forming localized oil films between the bearing surfaces. The skin friction of the moving shaft combined with the effect of the viscosity of the lubricant, and the gradually diminishing clearance of the wedge areas produce load supporting "oil-wedges" which can sustain heavy pressures without being broken or forced out from between the rotating members. The "oil-wedges" are dependent for their formation upon the relative rotation of the journal bearing and shaft. Obviously, shaft parameters such as concentricity with the journal box and surface finish, among others, play an important part in establishing such a film.

The present seal design takes advantage of the concept of a supporting "oil-wedge." As can be seen by inspection in FIGURE 2, the bottom surface 20 of the lip 18 is inclined downwardly with respect to the direction of sealant flow. This inclination, though slight, is sufficient to relieve the leading edge of the lip 18 of any significant radial pressure. It is important to notice, also, that the spring groove is formed opposite the lip 18 with its center in alignment with the rear face. Hence, when the continuous coil spring 24 is received in the groove 26, the radially acting force of the spring is concentrated in a plane containing the back face of the lip portion 18. It is important to note further, that the spring groove walls recede rapidly away from the sides of the spring. This feature insures that the lip pressure is properly distributed on the bottom surface 20; for it may be appreciated that if the spring groove were made the same diameter as the spring, with the walls of the groove lying closely adjacent the sides of the spring, certain side action of the spring, as it compresses into the rubber, would introduce side forces in the elastomer of the lip which would apply stray loads to the leading and trailing edges of the lip seal. For this reason, the spring groove 26 is designed to relieve the side loads but provide enough groove contour to accurately locate the spring center line in relation to the back face of the seal lip 18.

These structural features cooperate to produce a pressure distribution across the bottom surface 20 ranging from a negligible value at the leading edge 17 on the oil side of the lip, to a maximum value at the trailing edge 19. This pressure distribution facilitates establishing the sealant film 28. The film may be described as a supporting circular wedge of oil forming a liquid barrier, maintained by surface tension, between the rotating shaft surface and bottom surface of the lip.

In order to obtain a film, some of the aforementioned shaft and seal parameters must be brought under control. Theoretically, the garter spring is the only force variable that needs to be taken into account, for in the present seal, interference dimensions are negligible or at best eliminated, and are required only to compensate for polymer shrinkage under certain operating conditions. For example, some types of rubber will shrink under certain operating conditions more than others, in which case, the interference fit should be matched with the type of material used so that no deformation of the controlled contact surface occurs by stretching the seal over the shaft; and yet when the rubber does shrink, it will not exert a force sufficient to retract the contact surface in opposition to the radial force of the garter spring. In other words, the interference fit is a limitation placed by material properties and not by any requirement which must be taken into account in order to accomplish the invention.

It is important to realize that the dimensions of the present seal must be held to very close tolerances when dealing with properties of the magnitude involved here. The axial width of the lip 18 should range between 0.03 to 0.06 inch; however, for certain environments, a width up to 0.1 inch may be tolerated. The inclination of the bottom surface 20 is a relatively small angle and I have found that an angle between 4° and 8° produces the best results under a wider range of circumstances. Too great an angle would cause high loading in the plane of the rear face, cutting the film. The unit loading may be varied depending on seal design within a range approximately between 10 and 30 p.s.i. Unit loading is dependent almost exclusively on the spring tension.

Having now described the structural characteristics of my seal, I will now undertake some explanation of the operation. There are a lot of things that even those skilled in the art do not know about seal dynamics and the reasons for some of the observed effects. The forces acting on radial lip seals which must be taken into account by the designer may be broken into two classes; first, those arising from the seal itself, such as, lip diameter, lip pressure, concentricity, spring rate, lip pressure without springs, initial trim, frictional torque, and polymer characteristics; and secondly, those arising from the shaft, such as, surface finish, lay (the direction in which the surface finish is pointing due to the direction of grinding), and machining lead (the helical grooves formed by the grinding wheel as it traverses the shaft). The theory of formation of oil films between a lip and shaft involves a consideration of all these variables. One explanation is that it is formed similar to that of an oil film in a journal bearing. As in such bearings, if the distance between the rotating elements becomes too great, the supporting film is lost and replaced by a hydrodynamic flow. Conversely, if the clearance becomes too small, the oil film will be broken due to the high frictional drag between the parts. I have found that this critical range of clearance for lip type seals of the type described here, and in my parent application, is between 5 and 20 microinches. Naturally, the shaft finish should fall within this range or the frictional drag will be too great, thus destroying the oil film and producing lip wear.

In the conventional sharp edged lip seal, this frictional drag is great; for example, when the shaft starts rotating, it causes the seal to twist in the direction of the rotating shaft. This distortion is due to the high frictional torque or viscous friction of the oil between the lip and the shaft. As the shaft continues to rotate, the oil evaporates or is thrown out from under the lip creating further drag. Since there is now a broken fluid film between the rotating parts, the frictional forces increase from the viscous-type to the greater dry-friction type at localized places around the wiping area under the seal. This causes the lip to twist more in the direction of the shaft and to grab the shaft at one point and lift off at another producing a phenomenon known as lip flutter. As may be appreciated, this is a deleterious characteristic causing leaks and ultimately leads to lip failure.

Since a lip seal is flexible, unlike a journal bearing, the maintenance of the proper radial clearance depends largely on balancing the lifting pressure of the oil film against the opposing radial force of the garter spring; balance being achieved at a clearance preferably in the order of 15 microinches. The seal will leak if the maximum and minimum limits specified are not held; that is, a hydrodynamic flow will develop if the range is exceeded, and lip flutter will be observed if the clearance falls below the minimum limitation.

The present seal is noticeably free from lip flutter because of the oil film principle. Instead of a sharp lip contacting the shaft, my seal has a relatively broad surface calculated to be supported or "floated" above the shaft asperities by the sealant film. The film is more readily formed because of the downward inclination of the bottom surface 20 with respect to the direction of sealant flow; and to insure that the film is not broken, the lip pressure at the leading edge is minimized; this also helps conduct oil under the lip when the shaft surface finish is too smooth. A supporting "oil-wedge" is not likely to be broken as easily as a flat film because of the inherent directional characteristics of the wedge-shape which produces greater supporting pressures at the narrower portion, in this case, the trailing edge of the lip.

Since certain obvious changes and modifications will be apparent to one skilled in the art, the scope of the invention, as defined by the appended claims, is intended to cover such possible alterations of the illustrative embodiment.

I claim:

1. A fluid seal installation for sealing between two relatively rotating concentric members comprising, a flexible sealing annulus secured to one of the members, said annulus having a radially extending lip portion formed with an inclined surface of revolution engageable with the other of said members and forming an angle of from 4 degrees to 8 degrees with said other member, said lip portion having an axial width greater than 0.03 inch and less than 0.1 inch, said inclined surface sloping downwardly with respect to the direction of sealant flow, a supporting film of sealant formed uniformly under the inclined surface of the lip portion forcing a radial disengagement from said other member when relative rotation occurs, radial force applying means aligned with the edge of said lip portion remote from said sealant for resiliently opposing the disengagement and balancing the opposing radial forces when the supporting film is of an average thickness in the order of 5 to 20 microinches, said radial force applying means and said inclined surface cooperating to produce a pressure distribution across said inclined surface ranging from a negligible value at the sealant side of the lip to a maximum value at the side of said lip remote from the sealant side, the pressure applied by said flexible sealing annulus to said other member being greater than 10 pounds per square inch and less than 30 pounds per square inch, and said other member having a surface smoothness beneath the inclined surface in the order of 15 microinches whereby the supporting film and lip portion cooperate to form a fluid seal between the relatively rotating members.

2. A method of sealing between two relatively rotating concentric members comprising;
providing one of said members with a portion thereof having a surface smoothness in the order of 15 microinches;
assembling a flexible sealing annulus on the other of said members, said annulus having a radially extending lip portion formed with an inclined surface of revolution engageable with said portion of the one member and forming an angle of from 4 degrees to 8 degrees with said other member, said lip portion having an axial width greater than 0.03 inch and less than 0.1 inch;
conveying a liquid sealant into contact with the lip portion, the flow direction of said sealant being toward the downward slope of said inclined surface;
rotating one of the members relative to the other causing a supporting sealant film to form under the inclined surface of the lip portion and forcing a radial disengagement of said lip portion from the surface portion of the one member; applying radial forces remote from said sealant and in a plane containing the edge of said lip portion to balance the disengaging forces when the inclined surface of the lip portion is radially spaced an average of 5 to 20 microinches from the surface portion of the one member, the applied radial forces cooperating with said inclined surface to produce a pressure distribution across said inclined surface ranging from a negligible value at the sealant side of the lip portion to a maximum value at the side of said lip portion remote from the sealant side, the pressure applied by said flexible sealing annulus to the surface portion of the one member being greater than 10 pounds per square inch and less than 30 pounds per square inch, whereby the supporting film and the lip portion cooperate in forming a fluid seal between the relatively rotating members.

References Cited by the Examiner

UNITED STATES PATENTS 2,860,896 11/58 Naumann _____ 277—134
2,930,643 3/60 Mastrobattista et al. ____ 277—153

OTHER REFERENCES

Garlock Klozures, The Garlock Packing Co., copyright 1957 (pages 9 and 10).

Obert, E. F., Internal Combustion Engines, International Textbook Co., 1950, pp. 533–534.

Packing Rings in Bearings, a thesis by Werner Sell, 24 pages, March 10, 1960 (received).

LEWIS J. LENNY, *Primary Examiner.*

SAMUEL ROTHBERG, EDWARD V. BENHAM,
*Examiners.*